United States Patent [19]

Woodcock et al.

[11] Patent Number: 4,714,309
[45] Date of Patent: Dec. 22, 1987

[54] REFLECTION HOLOGRAMS

[75] Inventors: Brian H. Woodcock; Stuart S. Duncan, both of Clwyd, Wales

[73] Assignee: Pilkington P.E. Limited, United Kingdom

[21] Appl. No.: 741,540

[22] Filed: Jun. 5, 1985

[30] Foreign Application Priority Data

Jun. 9, 1984 [GB] United Kingdom ............... 8414761

[51] Int. Cl.$^4$ .......................... G02B 5/32; G03H 1/04
[52] U.S. Cl. ...................................... 350/3.7; 350/320
[58] Field of Search .......................... 350/3.6, 3.7, 320

[56] References Cited

U.S. PATENT DOCUMENTS 4,412,719  11/1983  Fienup ................................. 350/3.7

FOREIGN PATENT DOCUMENTS 1212559  11/1970  United Kingdom .
2071866  11/1983  United Kingdom .
2151036   7/1985  United Kingdom .

Primary Examiner—Bruce Y. Arnold
Attorney, Agent, or Firm—F. Eugene Davis, IV; Mark P. Stone

[57] ABSTRACT

A reflection hologram is recorded in a photosensitive film on a substrate held in a support by interference between an illuminating beam and its return from a back reflector. A scanning device moves the beam from a laser angularly about a fixed apparent beam source position which remains stationary relative to the film to give improved hologram formation with the back reflector spaced from the film.

17 Claims, 8 Drawing Figures

Fig.1.
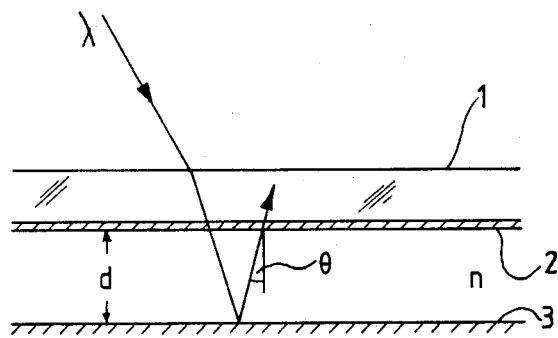
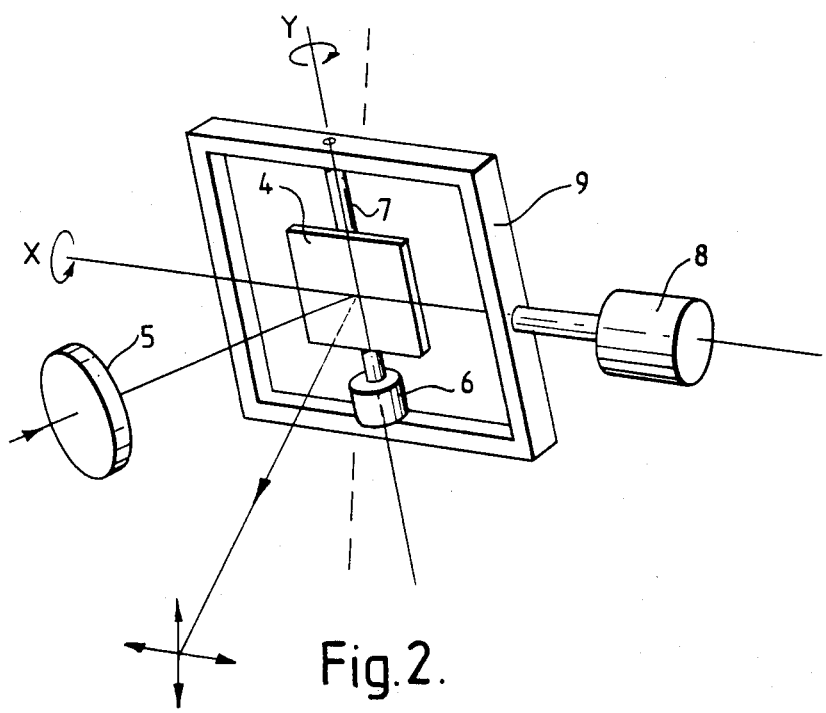
Fig.2.

4,714,309

REFLECTION HOLOGRAMS

BACKGROUND OF THE INVENTION

This invention concerns improvements in or relating to reflection holograms and relates more particularly to a method of and apparatus for making reflection holograms (sometimes conversely called holographic reflectors), and reflection holograms made by use of such method and apparatus.

Reflection holograms can provide efficient colour reflective filters which reflect a narrow waveband of incident light. A reflection hologram can be made by scanning a light beam, usually from a laser, over the surface of a photosensitive film behind which is a mirror. The incident beam and the beam reflected back from the mirror produce interference fringes in the film which, usually after suitable processing, provide corresponding variations in refractive index that give rise to the hologram. Such a method is disclosed in UK Pat. No. GB2071866B in which scanning of the laser beam is effected by two mirrors arranged to rotate about respective axes so as to produce horizontal and vertical movement. However, there is some limitation on the forms of hologram which can be satisfactorily produced by use of such mirror arrangement.

SUMMARY OF THE INVENTION

According to the present invention there is provided a method of making a reflection hologram including the steps of directing an illuminating beam towards a photosensitive film from a substantially fixed apparent beam source position, angularly moving the illuminating beam relatively to the film in a manner such that said substantially fixed apparent beam source position remains substantially stationary relative to the film, and reflecting the illuminating beam back to the film after passage therethrough from a reflector spaced from the film so as to cause interference in the film between the illuminating beam and its reflection back.

Such a method is distinguished from the use of a double scanning mirror arrangement as disclosed in UK Pat. No. 2071866B by the requirement for a substantially fixed apparent beam source position. With the backing mirror almost in contact with the photosensitive film to produce fringes lying parallel to the film as described in that patent, motion of the illuminating beam apparent source position does not generally affect the hologram formation adversely to a significant extent. However when the backing reflector is required to be spaced from the film, for example to make a hologram in which the interference fringes do not lie wholly parallel to the film, then apparent source movement can mar or prevent satisfactory hologram formation as more fully explained later.

The present invention further provides apparatus for use in making a reflection hologram, the apparatus comprising support means for supporting an element carrying a photosensitive film, a light emitter, light directing means for directing light from the emitter towards an element supported by the support means as an illuminating beam from a substantially fixed apparent beam source position and for angularly moving the illuminating beam relatively to the film in a manner such that said apparent beam source position remains substantially stationary relative to the film, and a reflector at a location spaced from the film on an element supported by the support means and arranged to reflect the illuminating beam back to the film after passage therethrough.

The illuminating beam movement relative to the film is preferably a scanning movement. The movement may be effected by, and said means for directing light may therefore comprise, an optical device with means for moving the device about mutually orthogonal axes which intersect at said substantially fixed apparent beam source position. For example, there may be a mirror and means for moving the mirror about mutually orthogonal axes which intersect at a point on the mirror surface from which incident light is reflected as the illuminating beam so that said point constitutes said substantially fixed apparent beam source position. Alternatively there may be first and second mirrors, means for moving the first and second mirrors about respective mutually orthogonal axes which intersect at a point on the second mirror surface from which light is reflected as the illuminating beam so that said point constitutes said substantially fixed apparent beam source position, and means for directing light reflected from the first mirror to the second mirror, the light being directed for example by reflection from a curved mirror. In an alternative arrangement there may be an optical fibre and means for moving an end portion of the optical fibre about mutually orthogonal axes which intersect at a point so that light issuing from the fibre end provides the illuminating beam and that point constitutes said substantially fixed apparent beam source position which may be forward of, at, or behind the fibre end. A lens may be associated with the fibre end to cause a desired convergence or divergence of the illuminating beam. If desired the illuminating beam may be collimated by collimating means, such as a lens, held stationary at a position between the light directing means and the element supported by the support means.

The illuminating beam is preferably a laser beam and said light emitter is therefore preferably a laser. It is to be understood that the illuminating beam light need not necessarily be in the visible part of the electromagnetic spectrum but could be infra-red or ultraviolet and the terms 'light', 'illuminating' and the like are to be construed accordingly.

The invention further provides a reflection hologram made by a method and/or by use of apparatus as set forth above.

BRIEF DESCRIPTION OF THE DRAWING

In order that the invention may be better understood, reference will now be made to the accompanying drawings, in which:

FIG. 1 is a schematic representation showing illumination of a photosensitive film FIG. 2 is a schematic representation of an optical scanning device

DESCRIPTION OF THE PREFERRED EMBODIMENTS

Figure 3:
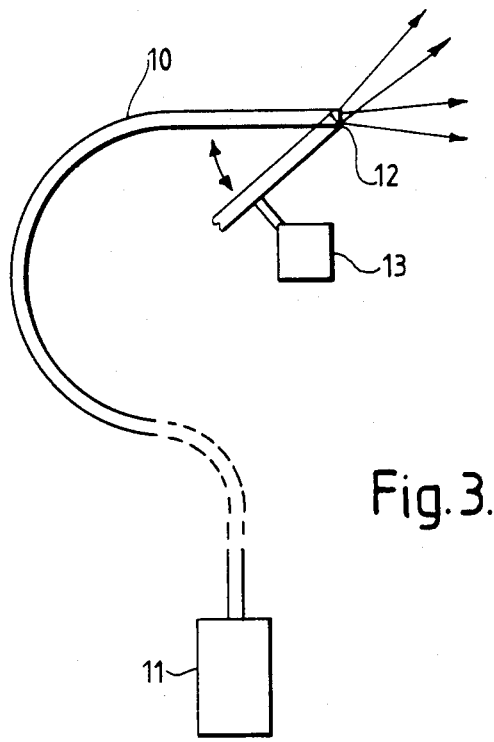
FIGS. 3, 4 and 5 are schematic representations of further optical scanning device arrangements.

FIG. 1 schematically illustrates the passage of a coherent monochromatic illuminating beam (usually a laser beam) through a transparent substrate 1 carrying a photosensitive film 2 to a reflector 3 which reflects the beam back towards the film 2. The illuminating beam and its reflection back interfere and a reflection hologram can be derived from the interference pattern recorded in the film 2. The illuminating beam can be moved relatively to the film 2, in particular in a scanning motion, but satisfactory hologram formation requires that the interference pattern in each exposed area of film should remain substantially constant and stationary. Change or movement of the interference pattern in a particular film area will tend to mar or prevent hologram formation in that area. When, as in FIG. 1, the back reflector 3 is spaced from the film 2, movement or change of the interference pattern can be caused by movement of the apparent beam source position. For a given angular movement of the apparent source position the effect on the hologram is dependent on the number of wavelengths separating the film from the backing reflector and the cosine of the angle of incidence at the reflector.

Specifically, the number N of nodes in the standing wave pattern between the film 2 and the back reflector 3 is given by d/s where 'd' is the distance between the film and the back reflector and 's' is the separation of the nodes. If λ is the illuminating beam wavelength, 'n' is the index of refraction of the medium between the film and the back reflector, and $\theta$ is the angle of incidence in that medium, then:

$$s = \lambda/(2n \cos \theta)$$

Hence $$N = d/s = (2nd \cos \theta)/\lambda$$

To avoid degradation of the hologram N needs to remain substantially constant throughout the exposure of each part of the film and therefore Cos $\theta$ must remain constant to the same degree. With a single node between the film and the back reflector (i.e. N=1) then constancy within about 10% is usually sufficient so Cos $\theta$ should also remain constant within 10%. However, the sensitivity to angle is proportional to N so that the permissible variation of Cos $\theta$ is generally 10/N%.

The medium between the film 2 and the back reflector 3 may conveniently be a liquid with a refractive index matching that of the substrate 1, which may conveniently be glass. Thus, by way of example, with a medium of refractive index 1.5, a separation 'd' of 1 mm and an illuminating wavelength α of 0.6×10⁻³ mm, N is 5×10³ Cos $\theta$ and the permissible change in Cos $\theta$ is 0.1/5×10³ Cos$\theta$. If, for example, $\theta$ is 20° in the medium (equivalent to 31° in air), then $\theta$ must remain constant to about 12 seconds of arc. Such constancy requires a substantially fixed apparent beam source position, which remains stationary relative to the film so that all the light reaching any point on the film appears to come from the same fixed source position.

As indicated above, a reflection hologram can be constructed conveniently by a scanning motion of the illuminating beam, the area over which the angular tolerance requirement must be maintained then being dependent on the beam diameter at the film and the degree of overlap between successive scans. Hologram construction using a scanning motion of the illuminating beam can overcome problems arising from a Gaussian beam intensity profile in which the intensity falls off radially outwardly, and 'beam noise' resulting from diffraction fringes caused by imperfections in the generating optics (which usually comprise a small pinhole illuminated by a laser via a microscope objective).

A particular example of 'fixed source' scanning arrangement is schematically shown in FIG. 2. It comprises a single front surface scanning mirror 4 which is angularly moveable about two mutually orthogonal axes of rotation which lie in the plane of the mirror and intersect at a point where light providing the illuminating beam is reflected from the mirror. The incident light is focussed onto the mirror at this point so that the illuminating beam for the hologram formation always appears to diverge from it. That point therefore constitutes a substantially fixed apparent beam source position which remains stationary relative to the film over which the beam is scanned.

In FIG. 2 a laser beam is schematically shown as being focussed by a lens 5 onto the front surface of mirror 4, the rotational axes X and Y lying in that front surface and intersecting at the centre where the focussed laser beam is incident. The mirror is mounted in a gimbal arrangement having two servo motors which effect the respective angular movements about the X and Y axes. Thus one (line scan) motor 6 angularly moves a shaft 7 on which the mirror 4 is carried to rotate the mirror about the Y axis. The other (frame scan) motor 8 angularly moves a frame 9 across which the shaft 7 extends to rotate the mirror about the X axis. Suitable bearings are of course provided to permit sufficiently precise movement of the frame 9 and of the shaft 7 relatively to the frame 9, and suitable controls are provided for the motors 6 and 8 to effect the required scanning motion of the illuminating laser beam emanating from the centre point of the mirror 4. Also, the laser and associated optics are aligned to ensure that the incident beam focussed onto the mirror 4 strikes it with sufficient accuracy at the centre point where the rotational axes intersect. It will be appreciated that the accuracy required is dependent on the required beam diameter at the photosensitive film, and generally a small diameter beam can be used so that the film area exposed to the beam at any one instant corresponds to a very small angular movement of the mirror 4. The beam diameter at the film must, of course, be sufficient to provide an overlap between the incident and reflected (from the reflector 3 in FIG. 1) illuminating beams so as to produce the interference pattern by which the hologram is generated. By way of example, an illuminating beam diameter of 10 mm at the film would permit a distance ('d' in FIG. 1) between the film and the reflector of up to about 5 mm. At a working distance (between the film and the centre point of the scanning mirror) of 500 mm the 10 mm beam diameter would subtend an angle of 1° at the centre point of the scanning mirror. This represents the angle over which the 'fixed source' criterion will apply, which requires an angular movement of the scanning mirror of only 0.5°. Over this angle of movement a lateral displacement of the initial beam incident on the scanning mirror of 1 mm from the centre point would result in an apparent source movement of the order of 4 arc seconds. This would generally be acceptable (assuming other errors were negligible) for distances 'd' between the film and the reflector of up to about 3 mm but for longer distances alignment of the initial incident beam would usually be more critical. Also the accuracy requirements would of course be more relaxed for greater working distances and more critical for closer working distances.

Another example of 'fixed source' scanning arrangement is schematically illustrated in FIG. 3. This comprises an optical fibre 10 having an input end which receives light emitted by a laser 11 and an output end 12 from which the illuminating beam emanates. The fiber output end 12 is mounted in a manner such that the emergent beam can be moved angularly about a substantially fixed apparent beam source position which is shown in FIG. 3 as being at the fibre end. Movement of the fibre end to effect a required scanning motion of the illuminating beam can be achieved by means 13 which may, for example, comprise two motors operable to cause angular movement about orthogonal axes which intersect at the fiber end position. For a raster scan one motor can govern the line scan and the other the frame scan. The fibre end position remains substantially stationary relative to the film as the beam is scanned thus providing a substantially fixed apparent beam source position.

Figure 4:
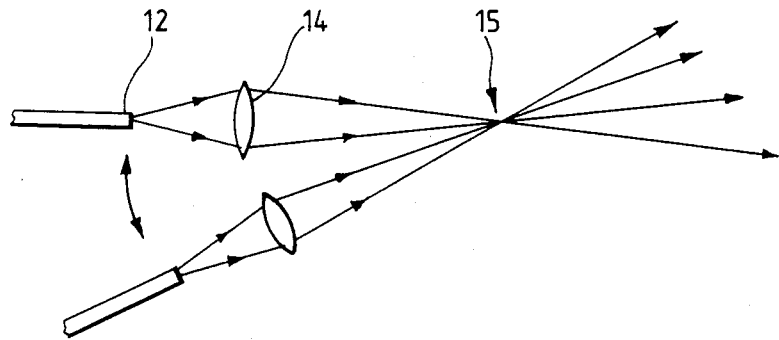
Figure 5:
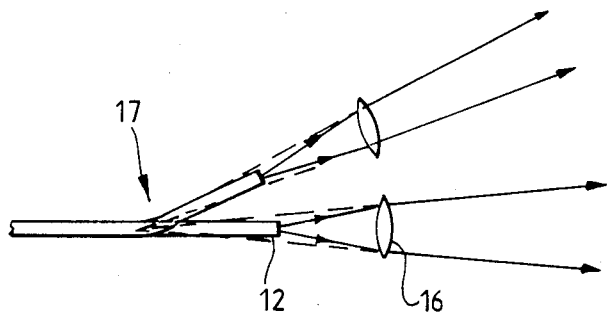

FIG. 3 schematically illustrates the principle of a fibre-optic scan arrangement in simple form but in practice some further complexity may be necessary. In particular, unless the optical fibre is of sufficiently low numerical aperture to give an acceptably small illuminating beam divergence itself, then some form of lens may be provided at or near the fibre output end, and the fibre end movement may be adapted to suit the appropriate fixed source position. FIG. 4 schematically shows an arrangement with a lens 14 at or near the fibre output end 12 which causes convergence of the emergent beam to a point 15 constituting the 'fixed source' position from which the illuminating beam diverges. The angular movement of the end portion of the fibre 10 and lens 14 is then about the point 15 at which the rotational axes intersect and which is forward of the fibre end and lens. FIG. 5 schematically shows an arrangement with a lens 16 at or near the fibre output end 12 which gives an illuminating beam apparently diverging from a point 17 constituting the 'fixed source' position and located behind the fibre end and its associated lens. In this arrangement the fibre is held stationary at point 17, and the fibre end portion and lens 16 are moved angularly about that point to effect the required scanning. It will be appreciated that any suitable means may be employed for effecting the required movement of the fibre end portion consistent with achievement of the necessary accuracy.

It will also be appreciated that a fibre optic arrangement can facilitate change of the illuminating wavelength in that the laser coupled to the input end of the optical fibre can readily be changed without disturbing the scanning set-up at the output end of the optical fibre. This can be especially advantageous if it is required to have superimposed different wavelength holograms in the same film.

It will further be appreciated that the apparent source at the 'fixed source' position may be virtual or real, and that other arrangements than those shown and described by way of example may be used to produce angular movement of the illuminating beam about the 'fixed source' position.

Figure 6:
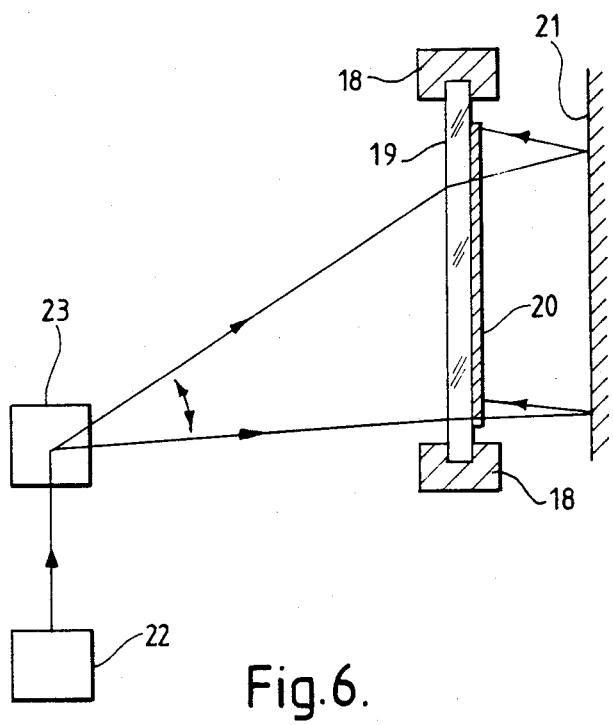
FIGS. 6 and 7 are schematic representations illustrating a method and apparatus in accordance with the invention.

FIG. 6 schematically shows a general apparatus set-up for use in making a reflection hologram in accordance with the principles previously described. It comprises a support member 18 arranged to support an element 19 (corresponding to the substrate 1 in FIG. 1) carrying a photosensitive film 20 (2 in FIG. 1), and a back reflector 21 (3 in FIG. 1) at a location spaced from the film 20 on the supported element 19. The spacing between the reflector 21 and the film 20 is greatly exaggerated in FIG. 6 for purposes of illustration and the space may in practice be filled with an index matching liquid as previously mentioned. The apparatus further comprises a light emitter in the form of a laser 22, and a light directing device 23 which receives light from the laser 22 and directs it towards the element 19 as an illuminating beam from a substantially fixed apparent beam source position. The light directing device 23 incorporates a scanning arrangement whereby the illuminating beam is moved relatively to the film in a manner such that the apparent beam source position remains substantially stationary relative to the film 20. The device 23 may be of a form as described with reference to any of FIGS. 2 to 5, or of any other suitable form.

Figure 7:
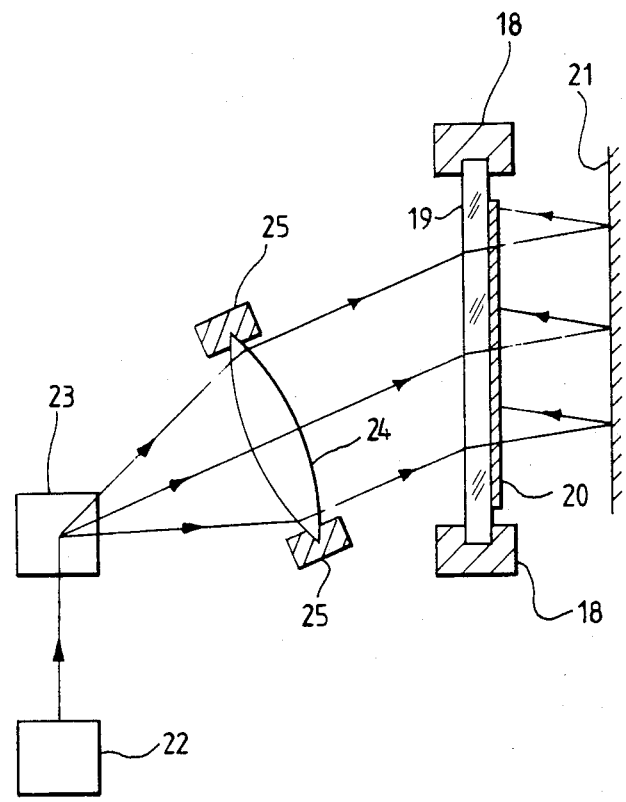

FIG. 7 schematically shows a modification to the apparatus of FIG. 6 whereby a collimated illuminating beam can be employed. This modification involves the provision of a collimating lens 24 which is held stationary in a suitable mounting 25 at a position between the scanning device 23 and the element 19. Light directed by the scanning device 23 is used as though it were a real point source, the substantially fixed apparent beam source position being effectively transferred to and remaining substantially stationary at infinity through the action of the stationary collimating lens 24.

The method of operation of the apparatus schematically shown in FIGS. 6 and 7 will be apparent from the preceding description. Briefly the illuminating beam is transmitted through the element 19 and film 20 and the back reflector 21 is arranged to reflect it back to the film 20. An interference pattern is set up in the film and, by virtue of the substantially fixed apparent beam source position which remains substantially stationary relative to the film, the interference pattern in each particular film area is kept substantially constant and stationary as it is recorded in the photosensitive film. The resultant reflection hologram derived, usually by appropriate processing of the film which is preferably dichromated gelatine although other materials may be employed, from the recorded interference pattern is of corresponding quality. It will be understood that the expressions 'substantially fixed' and 'substantially stationary' used in relation to the apparent beam source position are intended to comprehend the tolerance permissible to achieve satisfactory hologram formation. It will further be understood that the film 20 and its substrate element 19 need not necessarily be planar but could if desired be curved or otherwise shaped and that the back reflector 21 need not be parallel to the film 20, and need not be planar, but may be inclined and/or shaped, for example as a concave or a convex curve, possibly to produce a resultant hologram in respect of which the interference fringes are correspondingly inclined and/or shaped, e.g. curved, and the present invention comprehends a method and apparatus of the type schematically illustrated by FIG. 6 or FIG. 7, and a reflection hologram made by use of such method and apparatus, whatever the form or shape of the film and back reflector and the resultant interference fringes.

Figure 8:
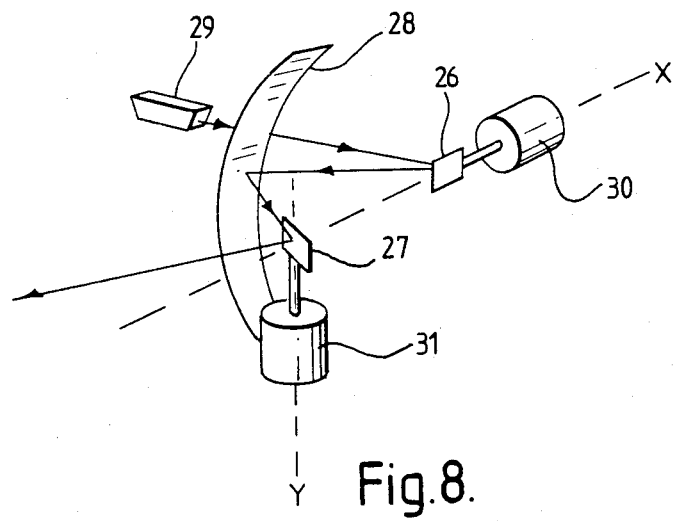
FIG. 8 is a schematic representation of another optical scanning device arrangement.

FIG. 8 schematically shows an alternative form of optical device to that shown in FIG. 2. In the FIG. 8 embodiment there are two front surface planar mirrors 26 and 27 rotatable about respective orthogonal axes X and Y which intersect at a point on the reflecting face of the mirror 27. A stationary curved mirror 28 is located so that light from a laser 29 incident on the first mirror 26 is reflected to the stationary mirror 28 and directed by reflection from the curved mirror 28 to the second mirror 27. Light reflected from the second mirror 27 provides the illuminating beam coming from the substantially fixed apparent beam source position constituted by said point on the reflecting face of the mirror 27. The movable mirrors 26 and 27 are driven by respective motors 30 and 31 and together produce a raster scan of the laser beam. One motor effects movement of its mirror appropriate to the frame scan, which is a relatively slow movement and the mirror is returned at the end of a frame to its starting angular position. The other motor effects movement of its mirror appropriate to the line scan, which is a relatively fast movement. Conveniently, therefore, this mirror is rotated continuously in a single angular direction, which is a simple and reliable arrangement but with some light wastage. The curved stationary mirror 28 may have cylindrical curvature and, depending on the precision required, a further optical element may be provided to take account of its anamorphic power so as to focus the beam to the point on the reflecting face of the mirror 27. Thus, another stationary anamorphic element may be provided in the laser beam path to the mirror 26. Alternatively a non-anamorphic focussing element may be provided in the laser beam path to the mirror 26 to focus the beam on to the reflecting face of that mirror, and the curved mirror 28 may be ellipsoidal to refocus the beam on to the reflecting face of the mirror 27. In practice, for ease of manufacture, a slice cut from a mirror of spherical curvature may provide a close enough approximation to an ellipsoidal mirror.

It will be appreciated that an arrangement similar to that of FIG. 8 could employ a lens instead of the curved mirror 28, the angularly moveable first and second mirrors 26 and 27 being disposed so that the laser beam is reflected from the first mirror towards the second mirror and the lens being located in the light path between the mirrors to direct the beam reflected from the first mirror on to the reflecting face of the second mirror at said point.

Other optical devices and arrangements for effecting movement of the illuminating beam about a substantially fixed apparent beam source position may occur to those skilled in the art, and any suitable such device or arrangement may, like that shown in FIG. 8, be used as the scanning device 23 in the apparatus of FIG. 6 and FIG. 7.

We claim:

1. A method of making a reflection hologram including the steps of directing an illuminating beam towards a photosensitive film from a substantially fixed apparent beam source position, moving the illuminating beam angularly relatively to the film in a manner such that said substantially fixed apparent beam source position remains substantially stationary relative to the film, and reflecting the illuminating beam back to the film after passage therethrough from a reflector spaced from the film so as to cause interference in the film between the illuminating beam and the beam reflected from the reflector.

2. A method according to claim 1 in which the illuminating beam makes successive scans relative to the film.

3. A method according to claim 1 in which the illuminating beam movement is effected by moving an optical device about mutually orthogonal axes which intersect at said substantially fixed apparent beam source position.

4. A method according to claim 3 comprising moving a mirror about mutually orthogonal axes which intersect at a point on the mirror surface from which incident light is reflected as the illuminating beam so that said point constitutes said substantially fixed apparent beam source position.

5. A method according to claim 3 comprising moving first and second mirrors about respective mutually orthogonal axes which intersect at a point on the second mirror surface from which light is reflected as the illuminating beam so that said point constitutes said substantially fixed apparent beam source position, and directing light reflected from the first mirror to the second mirror.

6. A method according to claim 3 comprising moving an end portion of an optical fibre about mutually orthogonal axes which intersect at a point and issuing light from the fibre end to provide the illuminating beam so that said point constitutes said substantially fixed apparent beam source position.

7. A method according to claim 1 including the step of collimating the illuminating beam.

8. A method according to claim 1 which the illuminating beam is a laser beam.

9. A reflection hologram made by a method according to claim 1.

10. Apparatus for use in making a reflection hologram, the apparatus comprising support means for supporting an element carrying a photosensitive film, a ligh emitter, light directing means for directing light from the emitter towards an element supported by the support means as an illuminating beam from a substantially fixed apparent beam source position and for moving the illuminating beam angularly relatively to the film in a manner such that said substantially fixed apparent beam source position remains substantially stationary relative to the film, and a reflector at a location spaced from the film on the element supported by the support means and arranged to reflect the illuminating beam back to the film after passage therethrough.

11. Apparatus according to claim 9 in which said means for directing light are arranged such that the illuminating beam makes successive scans relative to the film.

12. Apparatus according to claim 10 in which said means for directing light comprise an optical device with means for moving the device about mutually orthogonal axes which intersect at said substantially fixed apparent beam source position.

13. Apparatus according to claim 12 comprising a mirror and means for moving the mirror about mutually orthogonal axes which intersect at a point on the mirror surface.

14. Apparatus according to claim 12 comprising first and second mirrors, means for moving the first and second mirrors about respective mutually orthogonal axes which intersect at a point on the second mirror surface, and means for directing light reflected from the first mirror to the second mirror.

15. Apparatus according to claim 12 comprising an optical fibre and means for moving an end portion of the optical fibre about mutually orthogonal axes which intersect at a point.

16. Apparatus according to claim 10 comprising collimating means held stationary at a position between the light directing means and the element supported by the support means to collimate the illuminating beam.

17. Apparatus according to claim 10 in which said light emitter is a laser.

* * * * *